US012566415B2

(12) United States Patent
Tsuneki

(10) Patent No.: US 12,566,415 B2
(45) Date of Patent: Mar. 3, 2026

(54) ADJUSTMENT ASSISTANCE DEVICE, CONTROL SYSTEM, AND ADJUSTMENT ASSISTANCE METHOD

(71) Applicant: FANUC CORPORATION, Yamanashi (JP)

(72) Inventor: Ryoutarou Tsuneki, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 358 days.

(21) Appl. No.: 18/269,097

(22) PCT Filed: Feb. 24, 2022

(86) PCT No.: PCT/JP2022/007677
§ 371 (c)(1),
(2) Date: Jun. 22, 2023

(87) PCT Pub. No.: WO2022/186051
PCT Pub. Date: Sep. 9, 2022

(65) Prior Publication Data
US 2024/0058950 A1 Feb. 22, 2024

(30) Foreign Application Priority Data

Mar. 2, 2021 (JP) ................................. 2021-032675

(51) Int. Cl.
*G05B 13/04* (2006.01)
*B25J 9/16* (2006.01)
(52) U.S. Cl.
CPC .......... *G05B 13/042* (2013.01); *B25J 9/1605* (2013.01); *B25J 9/163* (2013.01); *B25J 9/1694* (2013.01)

(58) Field of Classification Search
CPC ........ B25J 9/1605; B25J 9/163; B25J 9/1694; G05B 19/19; G05B 13/042; H02P 21/0014
See application file for complete search history.

(56) References Cited

U.S. PATENT DOCUMENTS

2013/0173026 A1* 7/2013 Kawana ................... G05B 5/01
                                                    700/30
2020/0395879 A1* 12/2020 Walter ............. G05B 19/41885

FOREIGN PATENT DOCUMENTS

CN      111580458 A  *  8/2020  ............. G05B 19/04
JP      11-506553        6/1999
(Continued)

OTHER PUBLICATIONS

International Search Report issued Apr. 26, 2022 in corresponding International Application No. PCT/JP2022/007677.

*Primary Examiner* — Mong-Shune Chung
(74) *Attorney, Agent, or Firm* — Wenderoth, Lind & Ponack, L.L.P.

(57) ABSTRACT

The present invention performs simulation for a case where a plurality of degrees are set for feedforward, and provides assistance in adjustment of an acceleration/deceleration time constant and a feedforward parameter. The present invention is provided with: a mechanical model creation unit that creates mechanical models of a motor and a mechanism portion of a machine tool, a robot, or an industrial machine; a simulation unit that includes the mechanical models and a feedforward processing section and that is for performing simulation of operation of a servo control device for controlling the motor; and an adjustment unit that adjusts an acceleration/deceleration time constant for generating a position command, and a parameter of the feedforward processing section. The adjustment unit adjusts a plurality the acceleration/deceleration time constants and parameters (Continued)

corresponding to when a plurality of degrees has been set for the feedforward processing section.

7 Claims, 9 Drawing Sheets

(56) References Cited

FOREIGN PATENT DOCUMENTS

| | | | |
|---|---|---|---|
| JP | 2018-152012 | 9/2018 | |
| JP | 2018-181217 | 11/2018 | |
| JP | 2019-3465 | 1/2019 | |
| JP | 2019003465 A * | 1/2019 | |
| JP | 2019-164484 | 9/2019 | |
| JP | 2020-27366 | 2/2020 | |
| JP | 2020027366 A * | 2/2020 | |
| JP | 2020-71508 | 5/2020 | |
| JP | 2021-18566 | 2/2021 | |
| JP | 2021-117855 | 8/2021 | |
| WO | WO-2010134199 A1 * | 11/2010 | ......... G05B 19/0426 |
| WO | 2020/003738 | 1/2020 | |
| WO | WO-2020003738 A1 * | 1/2020 | ............. H02P 29/00 |

* cited by examiner

ADJUSTMENT ASSISTANCE DEVICE, CONTROL SYSTEM, AND ADJUSTMENT ASSISTANCE METHOD

TECHNICAL FIELD

The present invention relates to an adjustment assistance device, a control system, and an adjustment assistance method, and more particularly to an adjustment assistance device, a control system, and an adjustment assistance method that assist adjustment of acceleration/deceleration time constants and feedforward parameters.

BACKGROUND ART

In servo adjustment of a servo control device in first machines of machine tools, robots, industrial machines, or the like, first, minimum functions such as gain/filter and acceleration/deceleration are performed, then a necessary function is selected according to the machine, and the selected function is adjusted.

Techniques related to the servo adjustment of the servo control device are disclosed in Patent Documents 1 and 2, for example.

Patent Document 1 discloses a control parameter adjustment method for a servo motor. Such a control parameter adjustment method includes: a step of generating a simulation model that includes a controller model that models a controller having a position controller and a speed controller for controlling a drive of a motor, a motor model that models the motor, and a load model that models a load connected to the motor; a step of executing simulation using the simulation model in a speed control mode and evaluating parameters of the speed controller to select optimum values; and a step of using the selected parameters of the speed controller to execute the simulation in a position and speed control mode and evaluating parameters of the position controller to select optimum values.

Patent Document 2 discloses an output device that acquires a parameter or a first physical quantity, which has been learned, and an evaluation function value of a constituent element of a servo control device, and outputs information that allows a progress or a result of machine learning to be confirmed, from information indicating a relationship between the parameter, the first physical quantity or a second physical quantity determined from the parameter and the evaluation function value. In Patent Document 2, when the parameter is a coefficient of a transfer function of the constituent element of the servo control device, the output device instructs the servo control device to change a degree of the coefficient based on such information.

Patent Document 1: PCT International Publication No. WO2020/003738

Patent Document 2: Japanese Unexamined Patent Application, Publication No. 2020-071508

DISCLOSURE OF THE INVENTION

Problems to be Solved by the Invention

Specialized knowledge often required to select functions in the servo adjustment of the servo control device. For example, feedforward adjustment is usually performed using a simple model that assumes a rigid body, and even when a higher-degree feedforward is prepared, adjustment is not necessarily often performed using the higher-degree feedforward. For this reason, it is desirable to provide an adjustment assistance device, a control system, and an adjustment assistance method in which simulation is performed in cases where the higher-degree feedforward is used and not used to assist adjustment of an acceleration/deceleration time constant and feedforward parameters without operating the actual machine.

Means for Solving the Problems (1) A first aspect of the present disclosure provides an adjustment assistance device including: a machine model creation unit that creates machine models of a motor and a mechanical part of a machine tool, a robot, or an industrial machine; a simulation unit that includes the machine models and a feedforward processor, and that simulates operation of a servo control device to control the motor; and an adjustment unit that adjusts an acceleration/deceleration time constant for generating a position command and a parameter of the feedforward processor, the adjustment unit being configured to adjust each of the acceleration/deceleration time constant and the parameter when a plurality of degrees of the feedforward processor are set.

(2) A second aspect of the present disclosure provides a control system including: the adjustment assistance device according to (1) described above; a servo control device that controls a motor; and a numerical control device that outputs a position command to the servo control device.

(3) A third aspect of the present disclosure provides an adjustment assistance method of causing a computer to perform: a process of creating a machine model of a motor and a mechanical part of a machine tool, a robot, or an industrial machine;

a process of simulating operation of a servo control device that controls the motor with a simulation unit including the machine model and a feedforward processor; and a process of adjusting an acceleration/deceleration time constant for generating a position command and a parameter of the feedforward processor when a plurality of degrees of the feedforward processor are set.

Effects of the Invention

According to the aspects of the present disclosure, it is possible to assist adjustment of an acceleration/deceleration time constant and feedforward parameters by performing simulation in cases where the higher-degree feedforward is used and not used.

BRIEF DESCRIPTION OF THE DRAWINGS

FIG. 7 is a block diagram showing a configuration example of a servo control device;

FIG. 9 is a diagram showing another configuration example of a control system.

PREFERRED MODE FOR CARRYING OUT THE INVENTION

An embodiment of the present invention will be described in detail below with reference to the drawings.

First Embodiment

Figure 1:
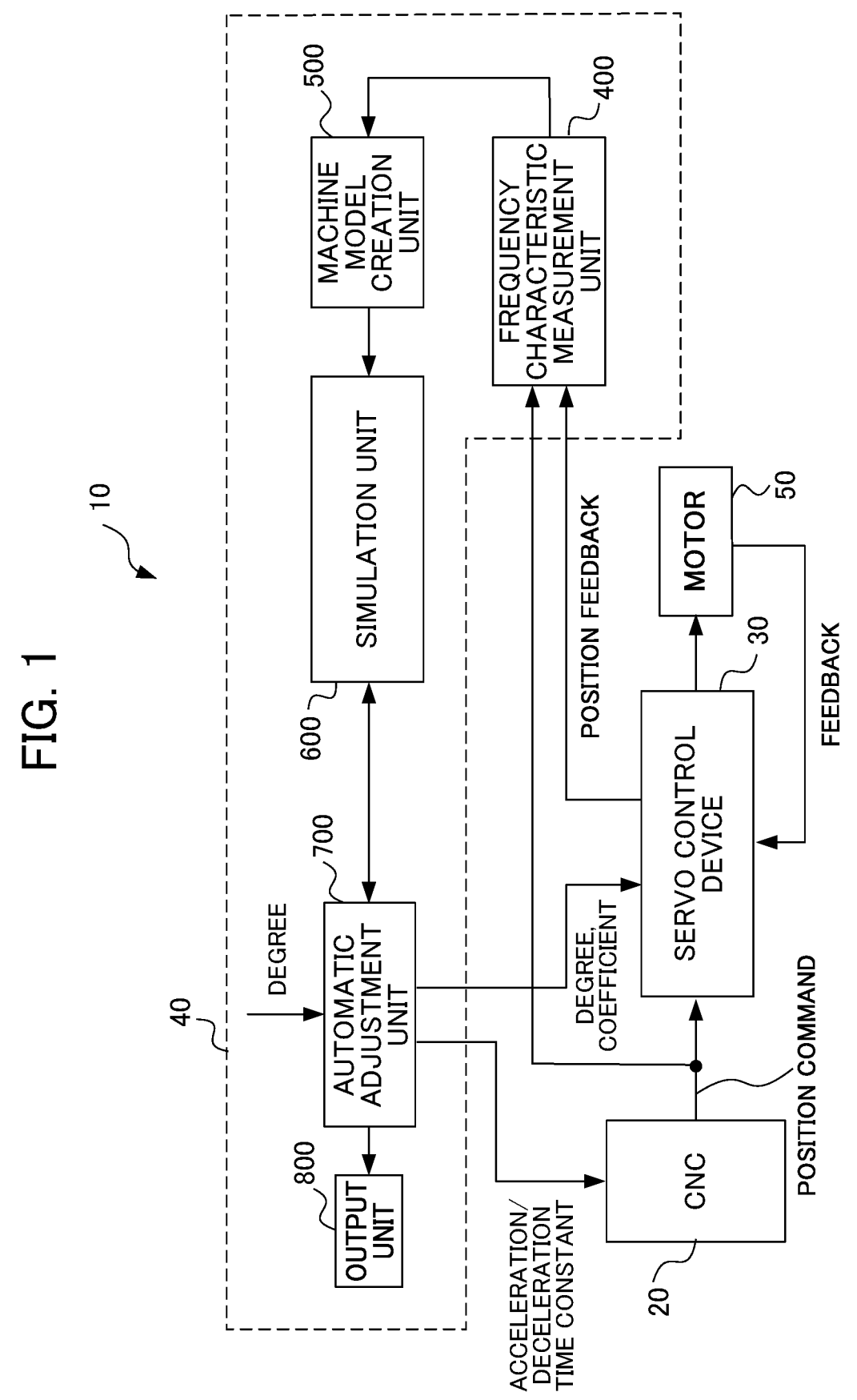
FIG. 1 is a block diagram showing a configuration example of a control system including an adjustment assistance device according to an embodiment of the present disclosure.

FIG. 1 is a block diagram showing a configuration example of a control system including an adjustment assistance device according to an embodiment of the present disclosure. A control system 10 shown in FIG. 1 includes a computer numerical control device (CNC device) 20 serving as a numerical control device, a servo control device 30, an adjustment assistance device 40, and a motor 50. Although the CNC device 20, the servo control device 30, and the adjustment assistance device 40 are shown separately in FIG. 1, the adjustment assistance device 40 may be included in the CNC device 20 or the servo control device 30. A target to be driven by the motor 50 of the control system 10 is, for example, a mechanical part of a machine tool, a robot, or an industrial machine. The motor 50 may be provided as a part of the machine tool, the robot, the industrial machine, or the like. Further, the control system 10 may be provided as a part of the machine tool, the robot, the industrial machine, or the like.

When the target to be driven by the motor 50 is a 3-axis machine, for example, the control system 10 includes the servo control device 30 and the motor 50 shown in FIG. 1 in an X-axis direction, a Y-axis direction, and a Z-direction, such that an object to be machined (workpiece) is machined in a manner that a table on which the workpiece is mounted is moved in the X-axis direction and the Y-axis direction and a spindle equipped with a tool is moved in the Z-axis direction. Mechanical parts of the 3-axis machine are, for example, a ball screw and a table connected to the ball screw. Further, the control system 10 includes a spindle motor control unit (not shown), which controls a rotation of the spindle, and a motor (not shown). A case will be described below in which a target to be driven the motor 50 is a mechanical part of a machine tool.

The CNC device 20 generates a position command based on a machining program, and outputs the command to the servo control device 30 and the adjustment assistance device 40. The servo control device 30 generates a torque command based on the position command, and controls the motor 50.

The adjustment assistance device 40 creates machine models of the motor 50 and the mechanical part of the machine tool using; a machine model creation unit 500, and sets the machine model in a simulation unit 600. An automatic adjustment unit 700 of the adjustment assistance device 40 simulates the CNC device 20 and the servo control device 30 using the simulation unit 600 having the same configuration as the CNC device 20 that generates the position command and the servo control device 30. Specifically, when a degree of a transfer function of at least one of a position feedforward calculator 308 and a speed feedforward calculator 309, which will be described below, of the servo control device 30 is changed, the adjustment assistance device 40 simulates operation of adjusting an acceleration deceleration time constant for generating the position command of the CNC device 20 and a coefficient of the transfer function of at least one of the position feedforward calculator 308 and the speed feedforward calculator 309. Then, the adjustment assistance device 40 sets, based on the simulation result, the acceleration/deceleration time constant of the CNC device 20 and the degree and coefficient of the transfer function of at least one of the position feedforward calculator 308 and the speed feedforward calculator 309. The motor 50 can use a linear motor for a straight line motion or a motor having a rotating shaft, for example.

A configuration and operation of the adjustment assistance device 40 will be described below. Configurations and operation of the CNC device 20 and the servo control device 30 will be described below.

\<Adjustment Assistance Device 40\>

Figure 2:
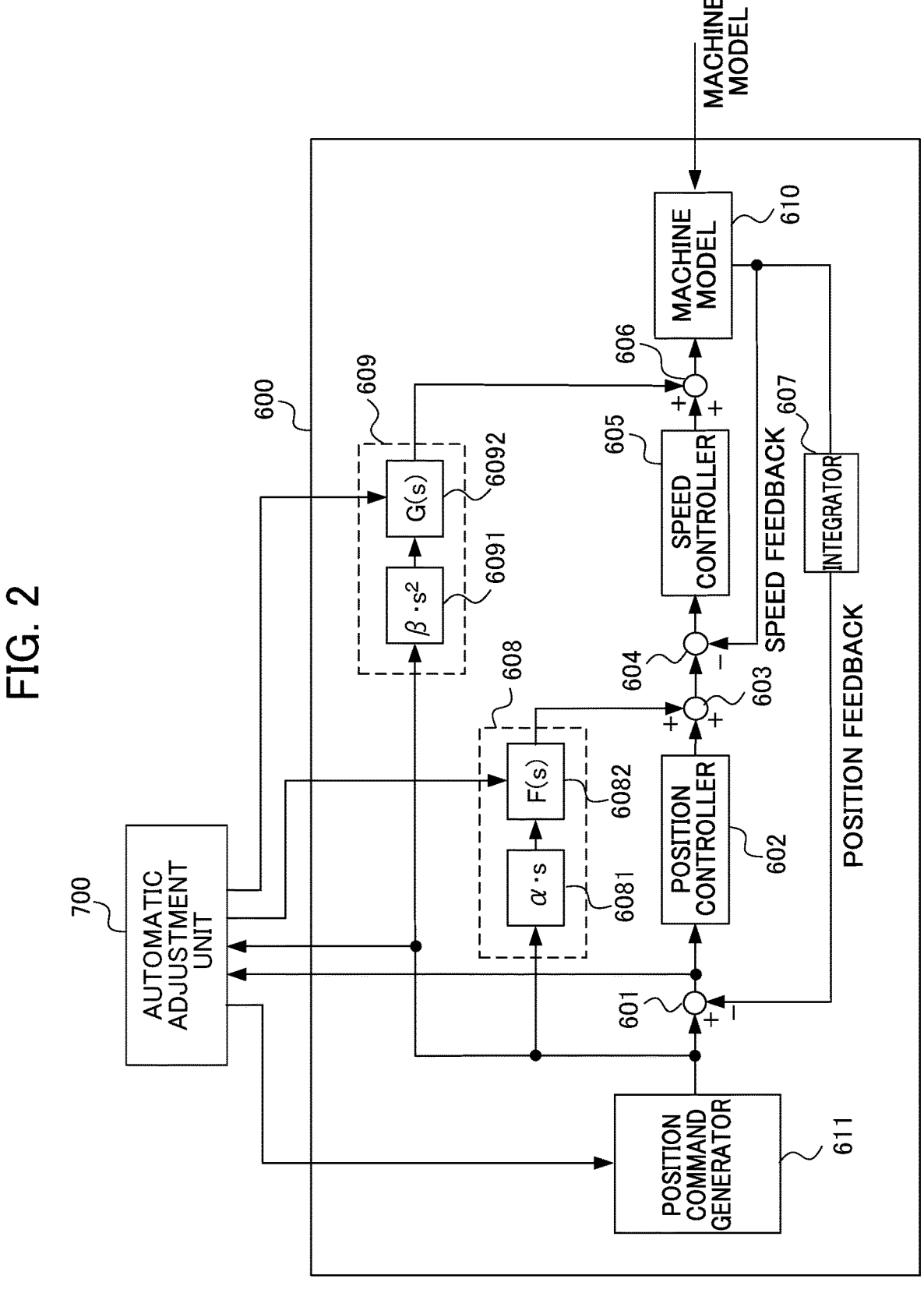
FIG. 2 is a block diagram showing a configuration example of a simulation unit.

As shown in FIG. 1, the adjustment assistance device 40 includes a frequency characteristic measurement unit 400, the machine model creation unit 500, the simulation unit 600, the automatic adjustment unit 700 serving as an adjustment unit, and an output unit 800. FIG. 2 is a block diagram showing a configuration example of the simulation unit 600. In the present embodiment, after the servo control device 30 is operated by the CNC device 20 and the machine model is created by the machine model creation unit 500, the automatic adjustment unit 700 of the adjustment assistance device 40 performs simulation with the simulation unit 600, sets a plurality of transfer functions $F(s)$ of a position feedforward processor 6082 of the simulation unit 600, which will be described below, having different degrees, and adjusts an acceleration/deceleration time constant of a position command generator 611 to be described below and coefficients $a_i$ and $b_j$ of the transfer function $F(s)$ of the position feedforward processor 6082 for each degree.

The frequency characteristic measurement unit 400 measures a frequency characteristic of a position loop that is a control loop of the servo control device 30. Specifically, frequency characteristics of an input/output gain and a phase delay are obtained from the position command and a position feedback of the servo control device 30. The frequency characteristic of the position loop is necessary for creating the machine model used for adjusting the coefficients $a_i$ and $b_j$ of the position feedforward processor 6082 to be described below of the simulation unit 600, but a frequency characteristic of a speed loop, which is a control loop, that is, a frequency characteristic of an input/output gain and a phase delay obtained from a speed command and a speed feedback is necessary for creating a machine model used for adjusting a coefficient of a speed feedforward processor 6092 which will be described below. Here, the frequency characteristic measurement unit 400 measures the frequency characteristic of the position loop to create the machine model used for adjusting the position feedforward processor 6082. In addition, the control loop also includes a loop other than the position loop and the speed loop, for example, a current loop (not shown). When the servo control device 30 has a current control unit in a rear stage of the speed control unit 305 to perform current feedback and has a current feedforward calculator including a current feedforward processor, the frequency characteristic measurement unit 400 measures a frequency characteristic of a current loop, which is a control loop of the servo control device 30. Specifically, the frequency characteristics of the input/output gain and the phase delay are obtained from the torque command and the current feedback of the servo control device 30. The servo control device 30 in FIG. 7, which will be described below, does not show a current control unit and a current feedforward calculator, but a current control unit and a current feedforward calculator may be included. The frequency characteristic of the current loop is necessary for creating a machine model used for adjusting a coefficient (a coefficient of a transfer function similar to Numerical Formula 3 described below) of a current feedforward processor of a current feedforward calculator of the simulation unit 600 having the same configuration as the servo control device 30. The current control unit and the current feedforward calculator are disclosed in Japanese Unexamined Patent Application, Publication No. 2019-164484, for example.

Figure 3:
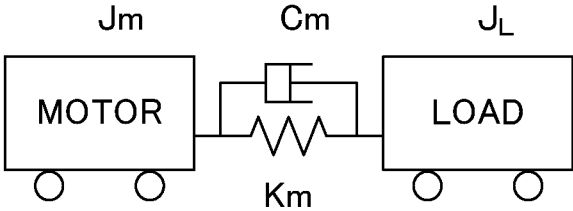
FIG. 3 is a diagram showing a machine model of a mechanical part of a motor and a machine tool.

The machine model creation unit 500 creates a machine model using, for example, a two-inertia system as shown in FIG. 3. Such a machine model is disclosed in "A Study on Low Frequency Vibration Suppression Control by Two-inertia system Model for Feed Axes of NC Machine Tools", Vol. 82, No. 8, pp. 745-750 (2016), Journal of the Japan Society for Precision Engineering, for example. The machine model creation unit 500 is not limited to creating a machine model using a two-inertia system, and can create a model using another method, for example, can also create a machine model by fitting a measured frequency characteristic as a black box model to a polynomial transfer function such as Numerical Formula 3, which will be described below without using a physical model. The machine model of the motor 50 and the mechanical part of the machine tool is represented by Numerical Formula 1 (shown as Formula 1 below) using a natural angular frequency $\omega_0$ and a damping coefficient $\zeta$ of a load, for example. Numerical Formula 1 represents a transfer function from the position of the motor to the position of the load.

$$\frac{2\zeta\omega_0 s + \omega_0^2}{s^2 + 2\zeta\omega_0 s + \omega_0^2} \qquad \text{[Formula 1]}$$

Figure 4:
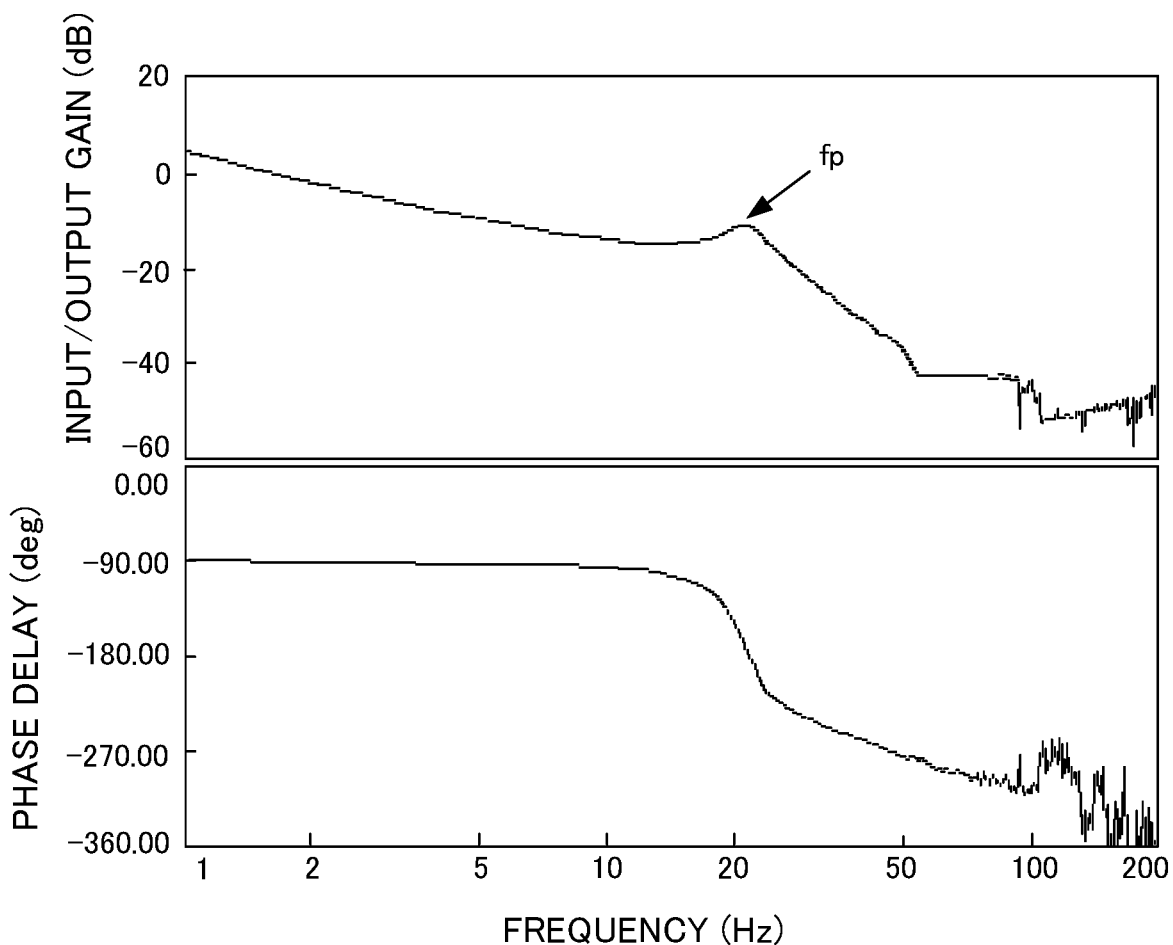
FIG. 4 is a diagram showing an example of frequency characteristics of an input/output gain and a phase delay measured by a frequency characteristic measurement unit.

The machine model creation unit 500 can obtain the natural angular frequency $\omega_0$ and the damping coefficient $\zeta$ of the load in Numerical Formula 1, using the frequency characteristics of the input/output gain and the phase delay measured by the frequency characteristic measurement unit 400. FIG. 4 is a diagram showing an example of the frequency characteristics of the input/output gain and the phase delay measured by the frequency characteristic measurement unit 400. The damping coefficient $\zeta$ can be obtained from a peak frequency fp of the input/output gain in FIG. 4 and a frequency width $\Delta f$ at a point 3 dB lower than a peak value of the input/output gain at the peak frequency fp, using a formula $\Delta f/fp$. The natural angular frequency $\omega_0$ of the load can be obtained from $\omega_0 = 2\pi fp$. Further, the machine model may be obtained from inertia of the motor, load inertia, a resonance frequency, and a peak value of a gain at resonance, using the machine model by the two-inertia system as shown in FIG. 3. The machine model is represented by Numerical Formula 2 (shown as Formula 2 below) using load inertia $J_L$, spring constant $K_m$, and damper constant $C_m$, for example. Numerical Formula 2 represents a transfer function from the position of the motor to the position of the load.

$$\frac{C_m s + K_m}{J_L s^2 + C_m s + K_m} \qquad \text{[Formula 2]}$$

The load inertia can be estimated load inertia estimator. The load inertia estimator can be provided in the adjustment assistance device 40, for example. The load inertia estimator acquires a value of current flowing through the motor 50, and also acquires a speed detection value from the motor 50. The load inertia estimator can estimate the load inertia using, for example, an inertia estimation method of a control device disclosed in Japanese Unexamined Patent Application, Publication No. 2010-148178. The control device disclosed in Japanese Unexamined Patent Application, Publication No. 2010-148178 includes a means for adding a sinusoidal command to a torque command for a motor, a means for acquiring a value of current flowing through the motor, a means for acquiring an acceleration value of the motor, and a means for estimating inertia (load inertia) of a body driven by the motor from a representative current value and a representative acceleration value, which are calculated from current and acceleration values in a plurality of cycles of the sinusoidal command, and a torque constant of the motor. The acceleration can be obtained by differential of the detected speed value. Assuming that the representative current value is defined as I, the representative acceleration value is defined as a, and the torque constant is defined as Kt, inertia J can be obtained from a relational expression of J=I·Kt/a.

A configuration example of the simulation unit 600 is shown in FIG. 2. As shown in FIG. 2, the simulation unit 600 includes a subtractor 601, a position control unit 602, an adder 603, a subtractor 604, a speed control unit 605, an adder 606, an integrator 607, a position feedforward calculator 608, and a speed feedforward calculator 609. The position feedforward calculator 608 includes a differentiator 6081 and the position feedforward processor 6082. The speed feedforward calculator 609 includes a twice differentiator 6091 and the speed feedforward processor 6092. Such a configuration is the same as that of the servo control device 30, which will be described below. Although not shown in FIG. 2, when the servo control device 30 includes a current control unit and a current feedforward calculator, the simulation unit 600 similarly includes a current control unit and a current feedforward calculator. Further, the simulation unit 600 includes a machine model 610 created by the machine model creation unit 500 and the position command generator 611 that generates a position command similar that of the CNC device 20. Here, the machine model 610 is obtained from Numerical Formula 1 using the frequency characteristics of the input/output gain and the phase delay measured by the frequency characteristic measurement unit 400. The acceleration/deceleration time constant for generating the position commas in the position command generator 611 is adjusted by the automatic adjustment unit 700. The position command generator 611 is provided in the simulation unit 600 herein, but may be provided outside the simulation unit 600.

The position command output from the position command generator 611 is input to the subtractor 601, the position feedforward calculator 608, and the speed feedforward calculator 609. The subtractor 601 receives the position command input from the position command generator 611, obtains a difference between the position command and the detected position subjected to position feedback, and outputs the difference to the position control unit 602 as a position error.

The position control unit 602 outputs a value obtained by multiplying the position error by position gain Kp to the adder 603 as a speed command. The position feedforward calculator 608 includes the differentiator 6081 and the position feedforward processor 6082. The position feedforward processor 6082 becomes a feedforward processor. The differentiator 6081 of the position feedforward calculator 608 differentiates the input position command and multiplies it by a constant α, and the position feedforward processor 6082 performs position feedforward processing indicated a transfer function F(s) shown in Numerical Formula 3 (shown as Formula 3 below) on the output of the differentiator 6081, and outputs the processing result as a position feedforward term to the adder 603. In Numerical Formula 3, coefficients $a_i$ and $b_j$ (m≥i≥0, n≥j≥0, m and n being 0 or natural numbers, which are degrees) are coefficients of the transfer function F(s) of the position feedforward processor 6082. Setting the degree means setting one or both of the number m and the number n. The coefficients $a_i$ and $b_j$ are parameters of the position feedforward processor 6082.

$$F(s) = \frac{b_0 + b_1 s + b_2 s^2 + \ldots + b_n s^n}{a_0 + a_1 s + a_2 s^2 + \ldots + a_m s^m} \qquad \text{[Formula 3]}$$

The adder 603 adds the speed command and the output value (position feedforward term) of the position feedforward calculator 608, and outputs the result to the subtractor 604 as a speed command subjected to feedforward control. The subtractor 604 obtains a difference between the output of the adder 603 and the detected speed value subjected to speed feedback, and outputs the difference to the speed control unit 605 as a speed error.

The speed control unit 605 adds an integral value obtained by multiplying the speed error by integral gain K1v and a value obtained by multiplying the speed error by proportional gain K2v, outputs the result to the adder 606 as a torque command.

The speed feedforward calculator 609 includes the twice differentiator 6091 and the speed feedforward processor 6092. The speed feedforward processor 6092 becomes a feedforward processor. The twice differentiator 6091 of the speed feedforward calculator 609 differentiates twice the input position command value and multiplies it by a constant β, and the speed feedforward processor 6092 performs speed feedforward processing indicated by a transfer function G(s) shown in Numerical Formula 4 (shown as Formula 4 below) on the output of the twice differentiator 6091, and outputs the processing result as a speed feedforward term to the adder 606. In Numerical Formula 4, coefficients $c_i$ and $d_j$ (p≥i≥0, q≥j≥0, p and q being 0 or natural numbers, which are degrees) are coefficients of the transfer function G(s) of the speed feedforward processor 6092. Setting the degree means setting one or both of the number p and the number q. The coefficients $c_i$ and $d_j$ are parameters of the speed feedforward processor 6092.

$$G(s) = \frac{d_0 + d_1 s + d_2 s^2 + \ldots + d_q s^q}{c_0 + c_1 s + c_2 s^2 + \ldots + c_p s^p} \qquad \text{[Formula 4]}$$

The adder 606 adds the torque command and the output value (speed feedforward term) of the speed feedforward calculator 609, and outputs the result to the machine model 610 as a torque command subjected to feedforward control. The machine model 610 inputs the speed of the machine model to the subtractor 604 as speed feedback. The speed is integrated by the integrator 607 and is input to the subtractor 601 as position feedback.

The automatic adjustment unit 700 sets a plurality of transfer functions F(s) of the position feedforward processor 6082 having different decrees, and adjusts the acceleration/deceleration time constant of the position command generator 611 and the coefficients $a_i$ and $b_j$ of the transfer function F(s) of the position feedforward processor 6082 for each degree. Coefficients $c_i$ and $d_j$ of a transfer function G(s) of the speed feedforward processor 6092 can be adjusted by obtaining the frequency characteristic of the speed loop and creating a machine model, but it is assumed herein that only the coefficients $a_i$ and $b_j$ of the transfer function F(s) of the position feedforward processor 6082 are adjusted. The automatic adjustment unit 700 adjusts the acceleration/deceleration time constant of the position command generator 611 such that a cycle time does not become small, and adjusts the coefficients $a_i$ and $b_j$ of the transfer function F(s) of the position feedforward processor 6082 such that a position error is reduced. Then, the automatic adjustment unit 700 outputs a one-time differential value and the position error of the position command of the simulation unit 600 based on each degree of plurality of degrees and the adjusted acceleration/deceleration time constant and the adjusted coefficients $a_i$ and $b_j$ for each degree to the output unit 800.

The degrees m and n of the transfer function F(s) of the position feedforward processor 6082 are set to m=0, n=0, and m, n≥1, for example. The degrees m and n in the case of m, n≥1 can be determined, for example, according to the number resonance points at a low frequency (frequency up to about 100 Hz). Specifically, the degrees m and n can be determined as quadratic when there is one resonance point, and the degrees m and n can be determined as quartic when there are two resonance points. The values of the degrees m and n may be determined in advance by a user, or may be determined the automatic adjustment unit 700 according to the number of resonance points. Initial values of the coefficients $a_i$ and $b_j$ of the transfer function F(s) of the position feedforward processor 6082 can be determined by the user. An initial value of the acceleration/deceleration time constant of the position command generator 611 can be determined by the user. For example, acceleration/deceleration of a small machine tool is set to make it easier to shake. The automatic adjustment unit 700 adjusts the acceleration/deceleration time constant from the initial value to prevent vibration.

The output unit 800 is a display device such as a liquid crystal display device, or a printer, for example. For example, on the display device, the output unit 800 displays, based on the input one-time differential value and position error of the position command by the adjusted acceleration/deceleration time constant and the adjusted coefficients $a_i$ and $b_j$ at each degree, information indicating to the user a servo state including a variation in the position error and a cycle time of the simulation unit 600 by the adjusted acceleration/deceleration time constant and the adjusted coefficients $a_i$ and $b_j$ at each degree. Here, the output refers to an operation that indicates the information on the servo state including at least the cycle time for each degree to the user, for example, refers to displaying such information on the display device or printing such information on paper with a printer. Each of the degrees and the value of the acceleration/deceleration time constant are output along with the servo state including the cycle time.

The user determines the variation in the position error and the cycle time in the plurality of degrees as indicated by the output unit 800, and inputs the degree of the transfer function F(s) of the position feedforward processor 6082 and the acceleration/deceleration time constant of the position command generator 611 such that the cycle time is short and the variation in the position error is reduced. The output unit 800 may output the characteristic diagram showing variations in one-time differential value of the position command and the position error, and the cycle time CT in each degree, and may be configured such that the user inputs information for specifying a characteristic diagram from a plurality of characteristic diagrams to cause the automatic adjustment unit 700 to specify the degree of the transfer function F(s) of the position feedforward processor 6082 and the acceleration/deceleration time constant of the position command generator 611 based on the specified characteristic diagram.

The automatic adjustment unit 700 sets the degrees m and n of the transfer function F(s) of the position feedforward processor 3082, which will be described below, in the servo control device 30, to the input degree, and sets the coefficients $a_i$ and $b_j$ of the transfer function F(s) the position feedforward processor 6082 adjusted with the input degree as the coefficients $a_i$ and $b_j$ of the transfer function F(s) of the position feedforward processor 3082 in the servo control device 30. Further, the automatic adjustment unit 700 sets the acceleration/deceleration time constant of the CNC device 20 to the input acceleration/deceleration time constant. The automatic adjustment unit 700 may determine the degrees and coefficients of the transfer function F(s) of the position feedforward processor 6082 and the acceleration/deceleration time constant of the position command generator 611 without indicating the information indicating the servo state including the cycle time to the user using the output unit 800 such that the cycle time is short and the variation in the position error is reduced, and may set them as the degrees and coefficients $a_i$ and $b_j$ of the transfer function F(s) of the position feedforward processor 3082 in the servo control device 30 and the acceleration/deceleration time constant of the CNC device 20.

Three examples of setting the acceleration/deceleration time constant of the position command generator 611 and the degrees of the transfer function F(s) of the position feedforward processor 6082 will be described below.

Example 1

The automatic adjustment unit 700 sets the acceleration/deceleration time constant of the position command generator 611, and sets the degrees m and n of the transfer function F(s) of the position feedforward processor 6082 to m=0 and n=0 (in the case of m=0 and n=0, they are called a lower degree). At this time, the coefficients of the transfer function F(s) of the position feedforward processor 6082 are $a_0$ and $b_0$.

Example 2

The automatic adjustment unit 700 sets the acceleration/deceleration time constant of the position command generator 611 to be smaller than the acceleration/deceleration time constant set in Example 1, and sets the degrees m and n of the transfer function F(s) of the position feedforward processor 6082 to be equal to those in Example 1.

Example 3

The automatic adjustment unit 700 sets the acceleration/deceleration time constant of the position command generator 611 to be equal to the acceleration/deceleration time constant set in Example 2 (the acceleration/deceleration time constant smaller than the acceleration/deceleration time constant con-

10 stant set in Example 1), and sets the degrees m and n of the transfer function F(s) of the position feedforward processor 6082 to natural numbers (m, n≥1) (when m and n are natural numbers, they are called a higher degree). At this time, the coefficients of the transfer function F(s) of the position feedforward processor 6082 are coefficients and $a_i$ and $b_j$ indicated in Numerical Formula 3. The automatic adjustment unit 700 adjusts the coefficients $a_i$ and $b_j$ such that the position error is reduced.

Figure 5:
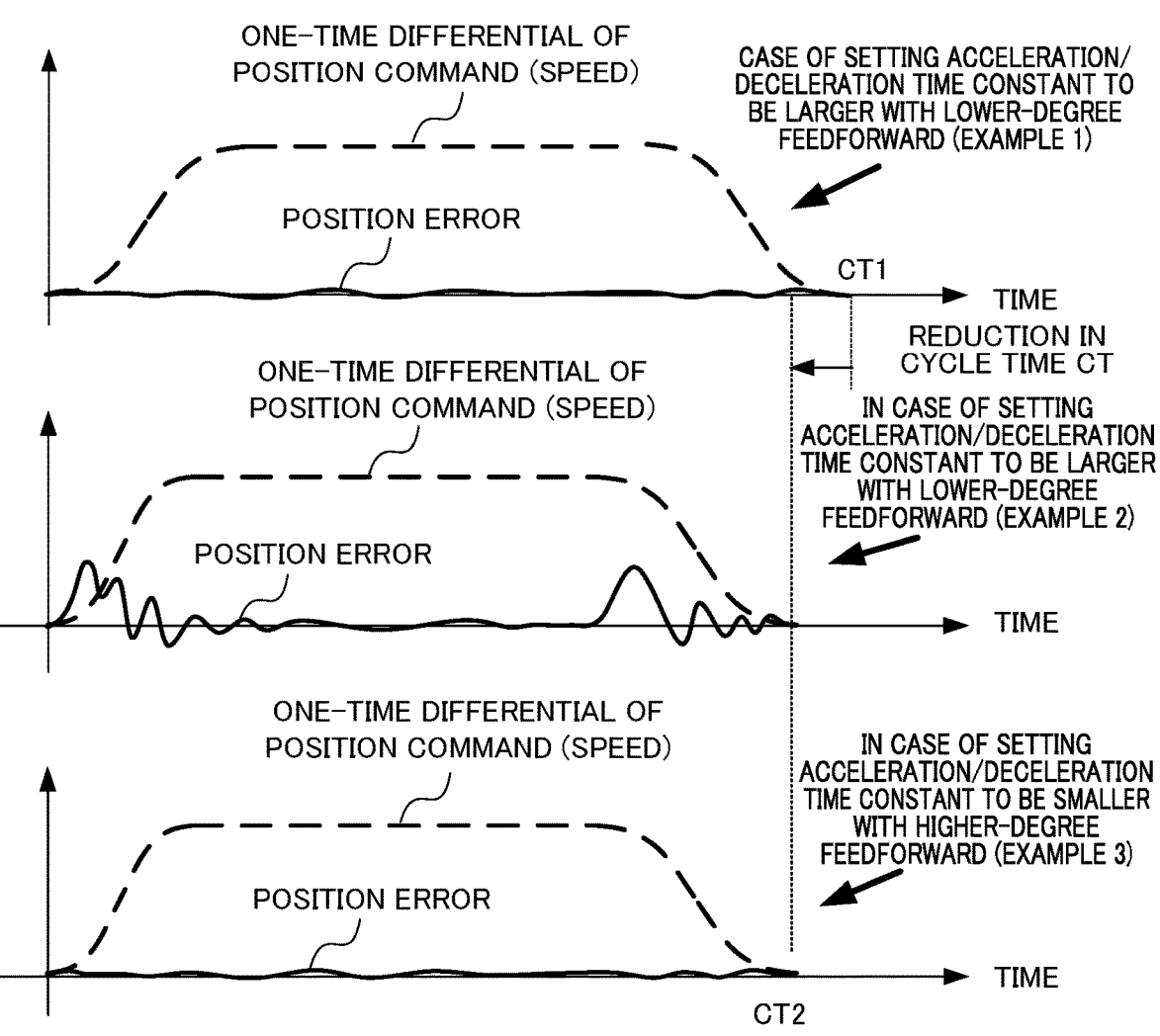
FIG. 5 is a characteristic diagram showing variations in one-time differential value of a position command and a position error, and cycle times in three Examples.

FIG. 5 is a characteristic diagram showing variations in one-time differential value of the position command and the position error, and cycle times CT in Examples 1, 2, and 3. The automatic adjustment unit 700 outputs one-time differential value of the position command and the position error to the output unit 800, when the acceleration/deceleration time constant of the position command generator 611 and the coefficients of the transfer function F(s) are set in Examples 1 and 3, for example. The output unit 800 displays the characteristic diagrams of Examples 1 and 3 shown in FIG. 5 on the display device, for example. From the characteristics indicating Examples 1 and 3 in FIG. 5 displayed on the display device, if the degrees m and n of the transfer function F(s) of the position feedforward processor 6082 are set to higher degrees, it can be recognized that the user can make the acceleration/deceleration time constant of the position command generator 611 smaller while preventing the variation in the position error, whereby a cycle time CT2 can be shorter than a cycle time CT1 (<CT1).

The automatic adjustment unit 700 can use machine learning to adjust the coefficients $a_i$ and $b_j$ the transfer function F(s) of the position feedforward processor 6082 and to adjust the acceleration/deceleration time constant of the position command generator 611.

Examples of Patent Documents include Japanese Unexamined Patent Application, Publication Nos. 2018-152012 and 2019-164484 that disclose methods of using reinforcement learning, which is one kind of machine learning, to adjust the coefficients $a_i$ and $b_j$ of the transfer function F(s) of the position feedforward processor 6082 and the coefficients $c_i$ and $d_j$ of the transfer function G(s) of the speed feedforward processor 6092. Japanese Unexamined Patent Application, Publication No. 2018-152012 discloses a machine learning device that learns coefficients of a transfer function of a speed feedforward calculation means by reinforcement learning, using a position error, and can be applied to the present embodiment by replacement of the speed feedforward calculation means with a position feedforward calculation means. Japanese Unexamined Patent Application, Publication No. 2019-164484 discloses a machine learning device that learns coefficients of a transfer function of a speed feedforward calculation means by reinforcement learning using a position error and then learns coefficients of a transfer function of a position feedforward calculation means by reinforcement learning using a position error. Japanese Unexamined Patent Application, Publication Nos. 2018-152012 and 2019-164484 disclose the machine learning for the coefficients of the transfer function of the speed feedforward calculation means of the servo control device or the coefficients of the transfer functions of the speed feedforward calculation means and the position feedforward calculation means, but the same applies to machine learning for coefficients of transfer functions of the position feedforward calculator 608 and the speed feedforward calculator 609 of the simulation unit 600 which is configured similarly the servo control device 30.

An example of Patent Documents includes Japanese Unexamined Patent Application, Publication No. 2018-

181217 that discloses a method of adjusting acceleration/deceleration of the position command generator 611 using reinforcement learning which is one Kind of machine learning, and the method can be applied to adjust an acceleration/deceleration time constant. Japanese Unexamined Patent Application, Publication No. 2018-152012 discloses a machine learning device that learns a speed distribution of each axis of a machine tool (N-th order time differential element of the speed of each axis). The machine learning device includes: a state observation unit configured to observe first state data representing the N-th order time differential element of the speed of each axis as a state variable representing a current state of an environment; a determination data acquisition unit configured to acquire determination data representing a properness determination result of at least any one of machining accuracy, surface quality, and machining time of the machined workpiece; and a learning unit configured to learn the N-th order time differential element of the speed of each axis in relation to at least any one of the machining accuracy, the surface quality, and the machining time of the machined workpiece using the state variable and the determination data. In a case of adjusting the acceleration/deceleration time constant using reinforcement learning, at least any one of the machining accuracy, the surface quality, and the machining time of the machined workpiece should be obtained, but is obtained by simulation in the present embodiment. The surface quality can be determined by surface roughness, for example. A method of calculating surface roughness by simulation is disclosed in "Simulation of Surface roughness and profile in high-speed end milling", Ki Yong Lee, Myeong Chang Kang, Yung Ho Jeong, Deuk Woo Lee, Jeong Suk Kim, Journal of Materials Processing Technology 113 (2001) 410-415, for example.

The functional blocks included in the adjustment assistance device 40 have been described. In order to implement these functional blocks, the adjustment assistance device 40 includes an arithmetic processing unit such as a CPU (Central Processing Unit). Further, each adjustment assistance device 40 also includes an auxiliary storage device such as an HDD (Hard Disk Drive) that stores various control programs such as application software or an OS (Operating System) and a main storage device such as a RAM (Random Access Memory) for storing data temporarily required when the arithmetic processing unit executes a program.

Then, in the adjustment assistance device 40, the arithmetic processing nit reads the application software or the OS from the auxiliary storage device, develops the read application software or OS in the main storage device, and performs arithmetic processing based on the application software or the OS. In addition, based on the result of arithmetic processing, various hardware included in each of the devices is controlled. Thus, the functional blocks of the present embodiment are implemented. In other words, the present embodiment can be realized by cooperation of hardware and software.

In a case of performing the machine learning in the automatic adjustment unit 700 of the adjustment assistance device 40, since the amount of computation associated with the machine learning is large, the adjustment assistance device 40 can achieve high-speed processing, for example, by incorporating a GPU (Graphics Processing Units) in a personal computer and using the GPU for arithmetic processing associated with the machine learning through a technique referred to as a GPGPU (General-Purpose computing on Graphics Processing Units). Furthermore, for higher speed processing, the adjustment assistance device 40 may construct a computer cluster using a plurality of computers equipped with such a GPU and perform parallel processing using the plurality of computers included in the computer cluster.

Next, the CNC device 20 and the servo control device 30 will be described.

<CNC Device 20>

Figure 6:
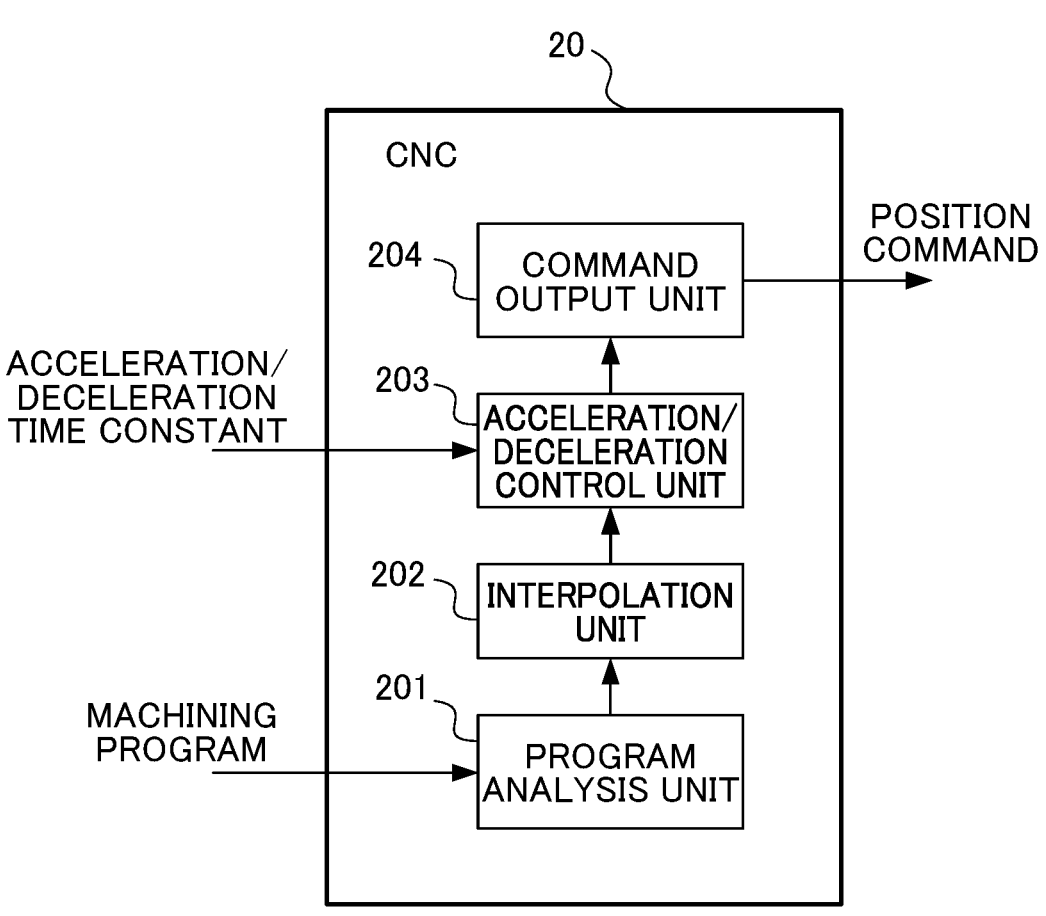
FIG. 6 is a block diagram showing a configuration example of a CNC device.

FIG. 6 is a block diagram showing a configuration example of the CNC device. The CNC device 20 shown in FIG. 6 includes a program analysis unit 201, an interpolation unit 202, an acceleration/deceleration control unit 203, and a command output unit 204. The CNC device 20 sends an operation command for controlling a rotation of the spindle to the spindle motor control unit, which will not be described herein.

The program analysis unit 201 sequentially reads and analyzes, from a machining program, blocks containing commands for movement along an X-axis, a Y-axis, and a Z-axis of the machine tool, and creates movement command data for commanding movement along each axis based on the analysts result. The interpolation unit 202 generates, based on the command for movement commanded by the movement command data output from the program analysis unit 201, interpolation data obtained by interpolating points on a command path at an interpolation cycle.

The acceleration/deceleration control unit 203 adjusts the acceleration/deceleration time constant using the acceleration/deceleration time constant output from the adjustment assistance device 40, performs acceleration/deceleration processing using the adjusted acceleration/deceleration time constant based on the interpolation data output from the interpolation unit 202, calculates a machining speed of each axis for each interpolation cycle, and outputs the calculated machining speed to the command output unit 204. The command output unit 204 generates a position command based on the machining speed of each axis output from the acceleration/deceleration control unit 203, and outputs the position command to the servo control device 30 and the adjustment assistance device 40. The acceleration/deceleration time constant is a parameter for creating the position command.

<Servo Control Device 30>

Figure 7:
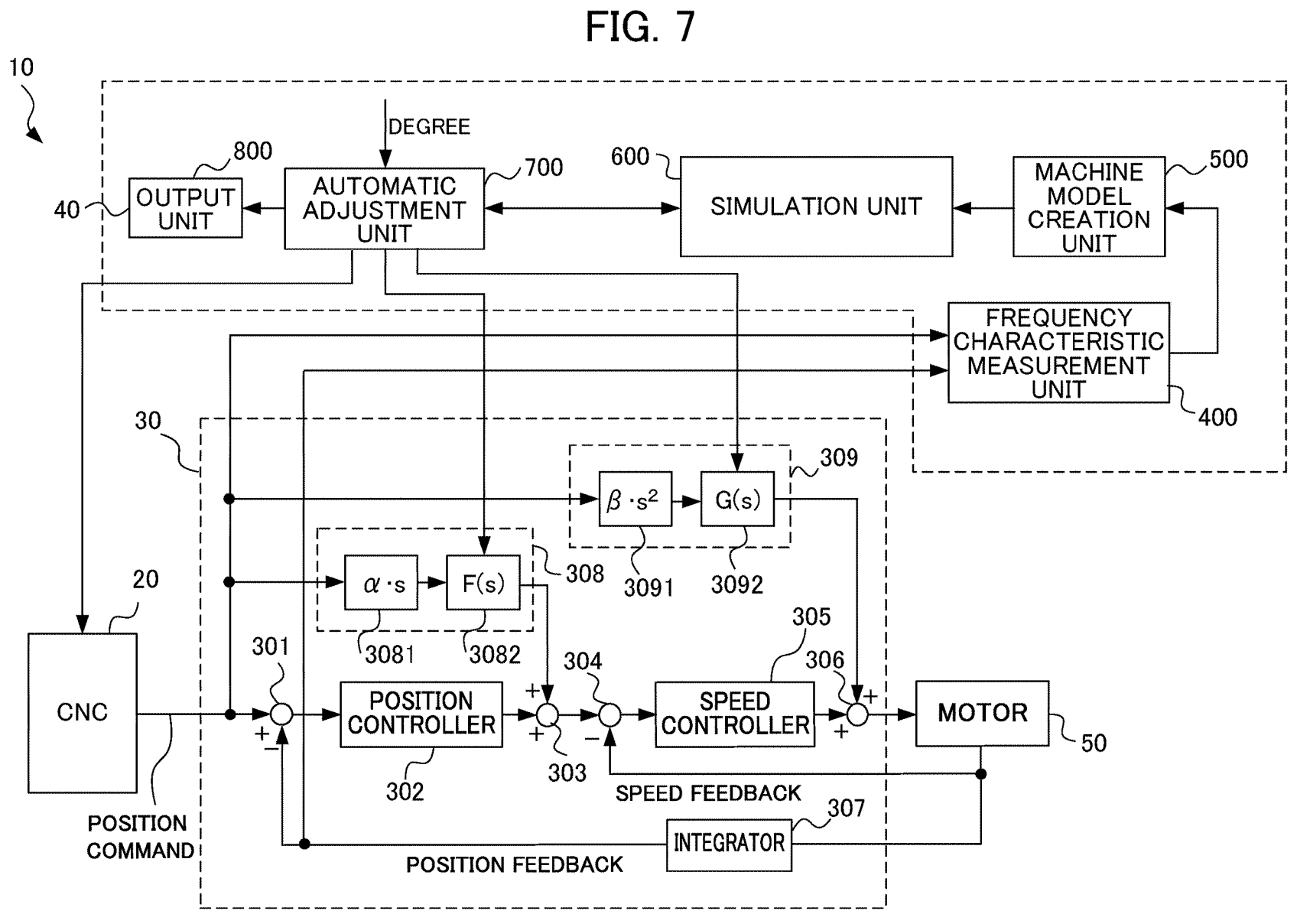

FIG. 7 is a block diagram showing a configuration example of the servo control device. FIG. 7 also shows components of the control system in addition to the components of the servo control device. As shown in the servo control device 30 includes a subtractor 301, a position control unit 302, an adder 303, a subtractor 304, a speed control unit 305, an adder 306, an integrator 307, a position feedforward calculator 308, and a speed feedforward calculator 309. The adder 306 is connected to the motor 50. Operation of the subtractor 301, the position control unit 302, the adder 303, the subtractor 304, the speed control unit 305, the adder 306, the integrator 307, the position feedforward calculator 308, and the speed feedforward calculator 309 are equivalent to the operation of the subtractor 601, the position control unit 602, the adder 603, the subtractor 604, the speed control unit 605, the adder 606, the integrator 607, the position feedforward calculator 608, and the speed feedforward calculator 609 which have been already described, and thus a detailed description thereof will not be given.

The position command output from the CNC device 20 is input to the subtractor 301, the position feedforward calculator 308, the speed feedforward calculator 309, and the frequency characteristic measurement unit 400 of the adjustment assistance device 40. The adder 306 is connected to the motor 50. The adder 306 adds a torque command and an output value (speed feedforward term) of the speed feed-forward calculator 309, and outputs the result to the motor 50 as a torque command subjected to feedforward control to drive the motor 50.

A rotation angle position of the motor 50 is detected by a rotary encoder, which is associated with the motor 50 and serves as a position detector, and a speed detection value is input to the subtractor 304 as speed feedback. The speed detection value is integrated by the integrator 307 to become a position detection value, and the position detection value is input to the subtractor 301 as position feedback.

Figure 8:
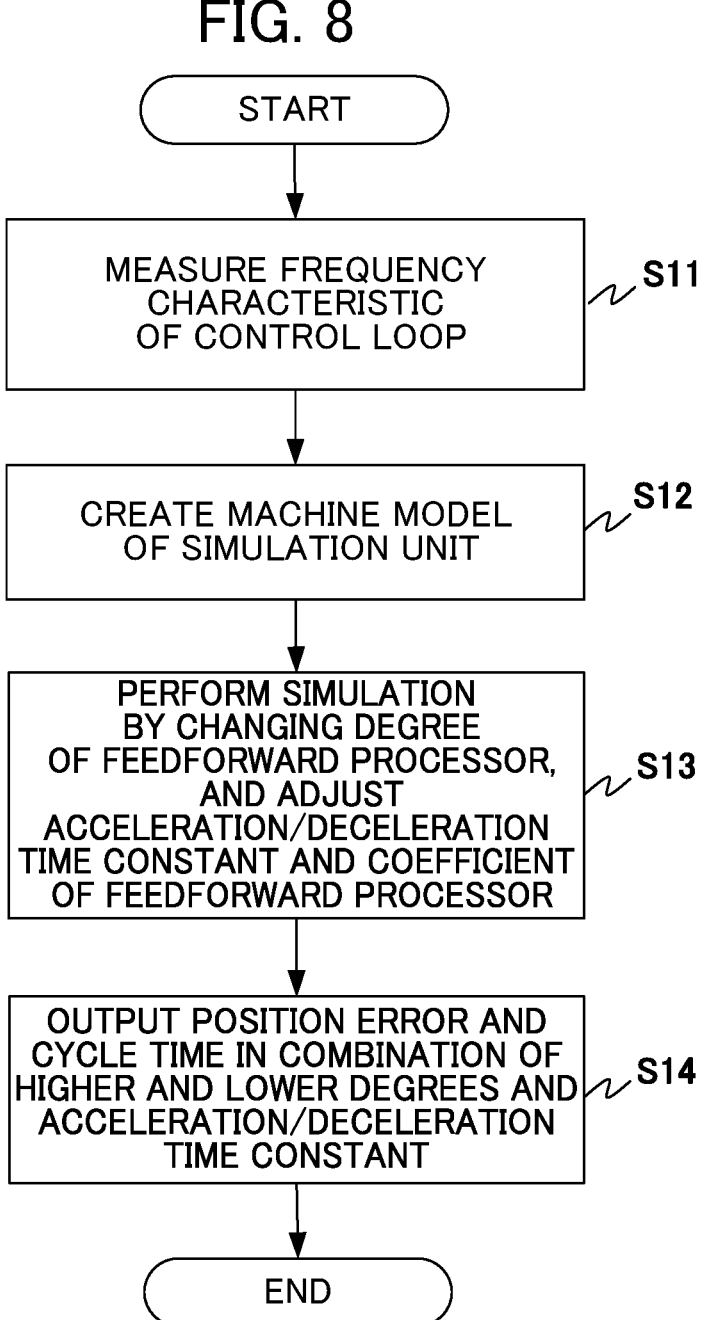
FIG. 8 is a flowchart showing operation of an adjustment assistance device.

Next, the operation of the adjustment assistance device 40 will be described with reference to a flowchart of FIG. 8. FIG. 8 is a flowchart showing the operation of the adjust-ment assistance device.

In Step S11, the frequency characteristic measurement unit 400 measures the frequency characteristic of the control loop. In Step S12, the machine model creation unit 500 uses the measured frequency characteristic to create the machine model represented by Numerical Formula 1 using the two-inertia system as shown in FIG. 3, as the machine model 610 of the simulation unit 600.

In Step S13, the automatic adjustment unit 700 sets a plurality of transfer functions F(s) of the position feedfor-ward processor 6082 having different degrees, and adjusts the acceleration/deceleration time constant of the position command generator 611 and the coefficients $a_i$ and $b_j$ of the transfer function F(s) of the position feedforward processor 6082 for each degree. In Step S14, the output unit 800 outputs the position error and the cycle time in a combina-tion of a case of the higher and lower degree and a case of the large or small size of an acceleration time constant.

In the above-described embodiment, the differences in servo states such as the position error and the cycle time are calculated by simulation in the case where the higher-degree feedforward is used and not used, and the effect (for example, reduction in the cycle time; is indicated to the user, whereby the selection of the servo function can be assisted. In the present embodiment, after the servo control device is operated by the CNC device and the machine model is created, the adjustment assistance device can set a plurality of transfer functions of the position feedforward processor at the simulation unit having different degrees, and can adjust the acceleration/deceleration time constant of the position command generator and the coefficients of the transfer function of the position feedforward processor for each degree without operating the servo control device by the CNC device.

Although an embodiment according to the present inven-tion has been described above, the respective components included in the adjustment assistance device and the control system can be implemented by hardware, software, or a combination of the hardware and the software. Further, the adjustment assistance method performed by the cooperation of the respective components included in the adjustment assistance device and the control system can also be imple-mented by hardware, software, or a combination of the hardware and the software. Here, "implementer by software" means implemented by a computer reading and executing a program.

The program may be stored and supplied to a computer using various types of non-transitory computer readable media. The non-transitory computer readable media include various types of tangible storage media. Examples of the non-transitory computer readable media include a magnetic recording medium (for example, a hard disk drive), a magneto-optic recording medium (for example, a magneto-optic disk), a CD-ROM (Read Only Memory), a CD-R, a CD-R/W, and a semiconductor memory (for example, a mask ROM, a PROM (Programmable ROM), an EPROM (Erasable PROM), a flash ROM, and a RAM (Random Access Memory)).

Although the above-described embodiment is a preferred embodiment of the present invention, the scope of the present invention is not limited to only the above-described embodiment, and the present invention can be implemented with various modifications without departing from the gist of the present invention.

<Freedom in System Configuration>

Figure 9:
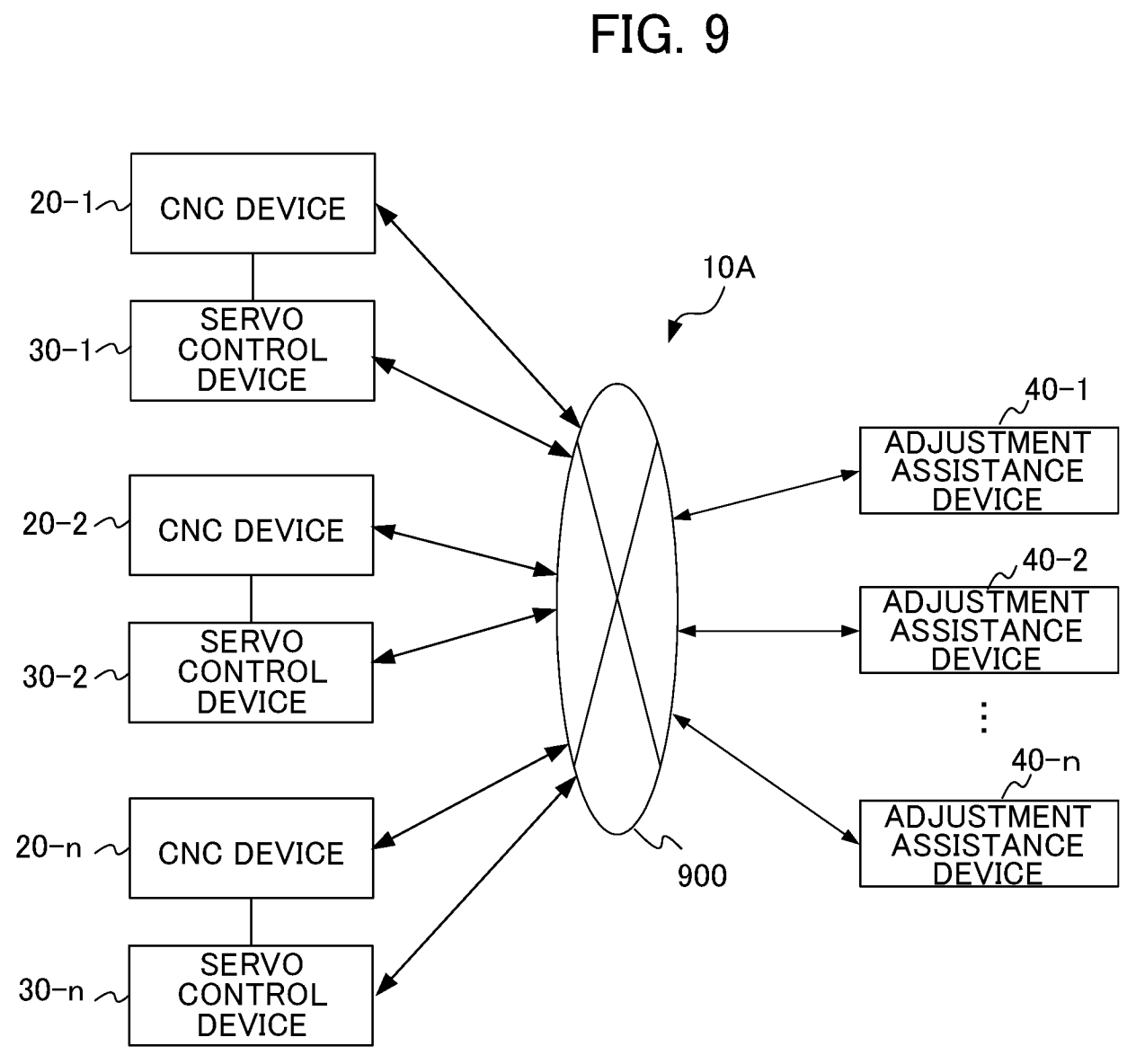

FIG. 9 is a block diagram showing another configuration of a control system. As shown in FIG. 9, a control system 10A includes n CNC devices 20-1 to 20-$n$, n servo control devices 30-1 to 30-$n$, adjustment assistance devices 40-1 to 40-$n$, and a network 900. Note that n is an arbitrary natural number. Each of the CNC devices 20-1 to 20-$n$ corresponds to the CNC device 20 shown in FIG. 1. Each of the n servo control devices 30-1 to 30-$n$ corresponds to the servo control device 30 shown in FIG. 1. Each of the adjustment assis-tance devices 40-1 to 40-$n$ corresponds to the adjustment assistance device 40.

Here, the CNC device 20-1, the servo control device 30-1, and the adjustment assistance device 40-1 are grouped in a one-to-one relationship, and are communicably connected to each other a the network 900. The CNC devices 20-2 to 20-$n$, the servo control devices 30-2 to 30-$n$, and the adjustment assistance devices 40-2 to 40-$n$ are connected similarly to the case of the CNC device 20-1, the servo control device 30-1, and the adjustment assistance device 40-1. In FIG. 9, although n sets of the CNC devices 20-1 to 20-$n$, the servo control devices 30-1 to 30-$n$, and the adjustment assistance devices 40-1 to 40-$n$ are connected via the network 900, the n sets of the CNC devices 20-1 to 20-$n$, the servo control devices 30-1 to 30-$n$, and the adjustment assistance devices 40-1 to 40-$n$ may be connected directly via connection interfaces. A plurality of n sets of the CNC devices 20-1 to 20-$n$, the servo control devices 30-1 to 30-$n$, and the adjustment assistance devices 40-1 to 40-$n$ may be provided in the same plant, and may be provided in different plants, for example.

The network 900 is a local area network (LAN) con-structed in a plant, the Internet, a public telephone network, or a combination thereof, for example. A specific commu-nication scheme of the network 900, whether the network uses a cable connection or a wireless connection, and the like are not particularly limited.

The adjustment assistance device, the control system, and the adjustment assistance method according to the present disclosure can take various embodiments having the follow-ing configurations including the above-described embodi-ment.

(1) An adjustment assistance device (for example, the adjustment assistance device 40) including: a machine model creation unit (for example, the machine model creation unit 500) that creates machine models of a motor (for example, the motor 50) and a mechanical part of a machine tool, a robot, or an industrial machine; a simulation unit (for example, the simulation unit 600) that includes the machine models and a feedforward processor (for example, the position feed-forward processor 6082 or the speed feedforward pro-cessor 6092), and that simulates operation of a servo control device to control the motor; and an adjustment unit (for example, the automatic adjustment unit 700) that adjusts an acceleration/deceleration time constant for generating a position command and a parameter of the feedforward processor, the adjustment unit being configured to adjust each of the acceleration/deceleration time constant and the parameter when a plurality of degrees of the feedforward processor are set. According to the adjustment assistance device, it is possible to assist adjustment of the acceleration/deceleration time constant and the feedforward parameters by performing simulation in cases where the higher-degree feedforward is used and not used.

(2) In the adjustment assistance device according to (1) above, the adjustment assistance device further includes a frequency characteristic measurement unit (for example, the frequency characteristic measurement unit 400) that measures a frequency characteristic of a control loop of the servo control device, and the machine model creation unit creates the machine models based on the frequency characteristic measured by the frequency characteristic measurement unit.

(3) the adjustment assistance device according to (1) or (2) above, the adjustment unit uses machine learning to adjust the acceleration/deceleration time constant and the parameter of the feedforward processor.

(4) In the adjustment assistance device according to any one of (1) to (3) above, the adjustment assistance device further includes an output unit (for example, the output unit 800) that presents information indicating a servo state including a cycle time when a plurality of degrees of the feedforward processor are set to a user. According to the adjustment assistance device, the differences in servo states such as the position error and the cycle time are calculated simulation in the case where the higher-degree feedforward is used and not used, and the effect (for example, reduction in the cycle time) is indicated to the user, whereby the selection of the servo function can be assisted.

(5) control system (for example, the control system 10) including: the adjustment assistance device (for example, the adjustment assistance device 40) according to any one of (1) to (4) above; servo control device (for example, the servo control device 30) that controls a motor; and a numerical control device (for example, the CNC device 20) that outputs a position command to the servo control device. According to the control system, it is possible to assist adjustment of the acceleration/deceleration time constant and the feedforward parameters by performing simulation in cases where the higher-degree feedforward is used and not used.

(6) In the control system according to (5) above, the adjustment assistance device sets the adjusted parameter as a parameter of a feedforward processor (for example, the position feedforward processor 3082 or a speed feedforward processor 3092) of the servo control device.

(7) An adjustment assistance method of causing a computer to perform: a process of creating machine models of a motor (for example, the motor 50) and a mechanical part of a machine tool, a robot, or an industrial machine; a process of simulating operation of a servo control device that controls the motor with a simulation unit (for example, the simulation unit 600) including the machine model and a feedforward processor (for example, the position feedforward processor 6082 or the speed feedforward processor 6092); and a process of adjusting an acceleration/deceleration time constant for generating a position command and a parameter of the feedforward processor when a plurality of degrees of the feedforward processor are set. According to the adjustment assistance method, it is possible to assist adjustment of the acceleration/deceleration time constant and the feedforward parameters by performing simulation in cases where the higher-degree feedforward is used and not used.

EXPLANATION OF REFERENCE NUMERALS

10, 10A control system
20 CNC device
30 servo control device
40 adjustment assistance device
50 motor
201 program analysis unit
202 interpolation unit
203 acceleration/deceleration control unit
204 command output unit
301, 601 subtractor
302, 602 position control unit
303, 603 adder
304, 604 subtractor
305, 605 speed control unit
306, 606 adder
307, 607 integrator
308, 608 position feedforward calculator
309, 609 speed feedforward calculator
400 frequency characteristic measurement unit
500 machine model creation unit
600 simulation unit
610 machine model
611 position command generator
700 automatic adjustment unit
800 output unit
900 network

The invention claimed is:

1. An adjustment assistance device comprising:
a machine model creation unit that creates machine models of a motor and a mechanical part of a machine tool, a robot, or an industrial machine;
a simulation unit that includes the machine models and a feedforward processor, and that simulates operation of a servo control device to control the motor;
a position command generator that generates a position command; and
an adjustment unit that adjusts an acceleration/deceleration time constant for generating the position command in the position command generator and a parameter of the feedforward processor,
the position command generator being provided in or outside the simulation unit, and
the adjustment unit being configured to adjust each of the acceleration/deceleration time constant and the parameter when a plurality of degrees of the feedforward processor are set.

2. The adjustment assistance device according to claim 1, further comprising a frequency characteristic measurement unit that measures a frequency characteristic of a control loop of the servo control device, wherein
the machine model creation unit creates the machine models based on the frequency characteristic measured by the frequency characteristic measurement unit.

3. The adjustment assistance device according to claim 1, wherein the adjustment unit uses machine learning to adjust the acceleration/deceleration time constant and the parameter of the feedforward processor.

4. The adjustment assistance device according to claim 1, further comprising an output unit that presents information indicating a servo state including a cycle time when a plurality of degrees of the feedforward processor are set to a user.

5. A control system comprising: the adjustment assistance device according to claim 1;

a servo control device that controls a motor; and a numerical control device that outputs a position command to the servo control device.

6. The control system according to claim 5, wherein the adjustment assistance device sets the adjusted parameter as a parameter of a feedforward processor of the servo control device.

7. An adjustment assistance method of causing a computer to perform:

a process of creating machine models of a motor and a mechanical part of a machine tool, a robot, or an industrial machine;

a process of simulating operation of a servo control device that controls the motor with a simulation unit including the machine models and a feedforward processor; and a process of adjusting an acceleration/deceleration time constant for generating a position command in a position command generator and a parameter of the feedforward processor when a plurality of degrees of the feedforward processor are set, the position command generator being provided in or outside the simulation unit.

\* \* \* \* \*